(12) United States Patent
Hanaoka et al.

(10) Patent No.: US 9,036,188 B2
(45) Date of Patent: May 19, 2015

(54) DATA TRANSMISSION DEVICE, DATA TRANSFER SERVER, AND DATA TRANSMISSION METHOD

(71) Applicant: SEIKO EPSON CORPORATION, Tokyo (JP)

(72) Inventors: Fuminori Hanaoka, Nagano (JP); Yutaka Akahori, Yamagata-mura (JP); Takatoshi Fujisawa, Nagano (JP); Masanori Kojima, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/745,079

(22) Filed: Jan. 18, 2013

(65) Prior Publication Data

US 2013/0188227 A1 Jul. 25, 2013

(30) Foreign Application Priority Data

Jan. 19, 2012 (JP) .................................. 2012-008710
Jan. 19, 2012 (JP) .................................. 2012-008712

(51) Int. Cl.
*G06F 3/12* (2006.01)
*H04N 1/00* (2006.01)
*H04N 1/32* (2006.01)

(52) U.S. Cl.
CPC ........ *H04N 1/00209* (2013.01); *H04N 1/00217* (2013.01); *H04N 1/0022* (2013.01); *H04N 1/00244* (2013.01); *H04N 1/00482* (2013.01); *H04N 1/32406* (2013.01); *H04N 2201/0015* (2013.01); *H04N 2201/0094* (2013.01)

(58) Field of Classification Search
CPC ..... H04N 21/20; H04N 1/00; H04N 1/00127; H04N 1/00151; H04N 1/00153; H04N 21/658
USPC .......... 358/1.9, 1.15, 501, 407; 709/202, 203, 709/219; 345/581, 589, 591, 593, 594, 595
See application file for complete search history.

(56) References Cited

U.S. PATENT DOCUMENTS

| 6,636,891 B1 * | 10/2003 | LeClair et al. ................ 709/208 |
| 2006/0044621 A1 * | 3/2006 | Ohhata et al. ................. 358/438 |
| 2008/0151318 A1 * | 6/2008 | Shobu ........................... 358/403 |

FOREIGN PATENT DOCUMENTS

JP 2008-011354 A 1/2008

* cited by examiner

*Primary Examiner* — Jamares Q Washington
(74) *Attorney, Agent, or Firm* — Global IP Counselors, LLP

(57) ABSTRACT

To make it possible for a user to easily send data, the invention is provided with: a candidate addressee display unit for receiving information relating to a candidate addressee from a data transfer server and displaying an addressee selection screen so that the candidate addressee can be selected; an addressee setting unit for notifying the data transfer server of a selection result from when the candidate addressee has been selected, and thereby setting the addressee; a data acquisition unit for acquiring data intended to be sent; and a transmission control unit for sending the data intended to be sent to the data transfer server and thereby causing the data intended to be sent to be transferred from the data transfer server to the addressee.

11 Claims, 3 Drawing Sheets

| USER IDENTIFIER | ADDRESS NAME | COMMUNICATION IDENTIFIER |
|---|---|---|
| ito1234 | Suzuki Goro | 012-234-5678 |
| ito1234 | Eigyobu | www.nagoya.com/eigyo |
| Nakane saburou | Ito Shiro | s-ito@sankou.co.jp |

DATA TRANSMISSION DEVICE, DATA TRANSFER SERVER, AND DATA TRANSMISSION METHOD

CROSS-REFERENCE TO RELATED APPLICATIONS

This application claims priority to Japanese Patent Application No. 2012-008710 filed on Jan. 19, 2012 and Japanese Patent Application No. 2012-008712 filed on Jan. 19, 2012. The entire disclosure of Japanese Patent Application Nos. 2012-008710 and 2012-008712 is hereby incorporated herein by reference.

BACKGROUND

1. Technical Field

The present invention relates to a data transmission device, a data transfer server, and a data transmission method.

2. Background Technology

Facsimiles for which utilization by an unspecified number of users is permitted have been set up at airports, hotels, convenience stores, and the like. Such facsimiles are utilized when a need arises to utilize a facsimile while one is travelling.

Japanese Laid-open Patent Publication No. 2008-11354 (Patent Document 1) is an example of the related art.

SUMMARY

Problems to be Solved by the Invention

It has been noted that in a case where there is assumed to be an unspecified number of users, it is unrealistic from the viewpoint of memory resources to have the contact line numbers of candidate addressees be registered in a facsimile. Also, the likelihood that the same user will make frequent use of a specific facsimile for which utilization by an unspecified number of users is permitted is low, and thus it is very wasteful to register the contact line numbers of the candidate addressees of the unspecified number of users in a specific facsimile. However, a problem has emerged in that a document cannot be sent when the contact line number of the addressee is not known, even though a need to use the facsimile while traveling can have arisen.

One purpose of the invention, which has been contrived in order to resolve such problems, is to make it possible for a user to easily send data.

Means Used to Solve the Above-Mentioned Problems

The data transmission device adapted to achieve the foregoing advantage is provided with: a candidate addressee display unit for receiving information relating to a candidate addressee from a data transfer server and displaying an addressee selection screen so that the candidate addressee can be selected; an addressee setting unit for notifying the data transfer server of a selection result from when the candidate addressee has been selected, and thereby setting the addressee; a data acquisition unit for acquiring data intended to be sent; and a transmission control unit for sending the data intended to be sent to the data transfer server and thereby causing the data intended to be sent to be transferred from the data transfer server to the selected addressee. The addressee setting unit can carry out the notification in accordance with a selection made by the user. The data acquisition unit can initiate processing for acquiring the data intended to be sent after the notification. The data acquisition unit can create the data intended to be set by scanning from a document intended to be sent.

(1) More specifically, for example, the data transmission device is provided with: a user identifier acquisition unit for accepting the input of a user identifier; a candidate addressee display unit for receiving a communication identifier of a candidate addressee from the data transfer server through the sending of the user identifier to the data transfer server, and for displaying the candidate addressee so that the candidate addressee can be selected; an addressee setting unit for receiving a job identifier corresponding to an addressee selected from among the candidate addressees from the data transfer server, through the sending, to the data transfer server, of the communication identifier of the addressee; a data acquisition unit for acquiring data intended to be sent, in response to the receipt of the job identifier; and a transmission control unit for sending the data intended to be sent to the data transfer server, in association with the job identifier, and thereby causing the data intended to be sent to be transferred from the data transfer server to the addressee.

Herein, the phrase "user identifier" refers not to an identifier that is set in place for the data transmission device, but rather to an identifier that is set in place for the user of the data transmission device. The phrase "addressee" refers to a data receiving device for receiving the data intended to be sent, or to a region in which the data receiving device stores the data intended to be sent. According to the invention, the inputting of a user identifier by an unspecified number of users who utilize the data transmission device makes it possible for the data transmission device to acquire the communication identifiers of the candidate addressees, and possible to set the communication identifier of the addressee to which the data intended to be sent is to be sent, via the data transfer server. That is, it becomes possible to send data to the addressee intended by the user, even in a case where the user is unable to establish the communication identifier of the addressee. Also, because the data transmission device acquires the data intended to be sent after having acquired the job identifier associated with the addressee, there will not be useless acquisition, by the data transmission device, of data intended to be sent that is not to be transferred from the data transfer server.

(2) In the data transmission device adapted to achieve the foregoing advantage, the candidate addressee display unit can display a plurality of candidate addressees corresponding to a plurality of communication identifiers conforming to a plurality of mutually different communication protocols, so that the candidate addressees can be selected, and the transmission control unit can cause the data intended to be sent to be transferred from the data transfer server to the addressee, by using the protocol to which the communication identifier of the selected addressee conforms. When this configuration is adopted, it is possible to send the data intended to be sent to any desired addressee among addressees having different communication protocols for receiving the data intended to be sent, such as facsimile, HTTP, or SMTP.

(3) In the data transmission device adapted to achieve the foregoing advantage, the candidate addressee display unit can display the plurality of candidate addressees in a list within one layer. When this configuration is adopted, it is easier to operate the setting of the addressee, because the data transmission device is made to display the candidate addressees without regard for the communication protocol of the addressee.

(4) In the data transmission device adapted to achieve the foregoing advantage, the data acquisition unit can read the data intended to be sent from a document intended to be sent. When this configuration is adopted, the image data of the document intended to be sent can be sent to the addressee.

(5) A data transfer server adapted to achieve the foregoing advantage is provided with: a candidate addressee storage unit for storing communication identifiers for a plurality of candidate addressees in association with any of a plurality of user identifiers; a candidate addressee transmission unit for receiving the user identifier from a data transmission device and returning the communication identifier of the candidate addressee corresponding to the received user identifier; a transfer setting unit for receiving the communication identifier of the addressee from a plurality of the data transmission devices and returning a job identifier corresponding to the received communication identifier of the addressee; and a data transfer unit for receiving data intended to be sent in association with the job identifier and sending the data intended to be sent to the addressee corresponding to the received data intended to be sent.

According to the invention, the inputting of a user identifier by an unspecified number of users who utilize the data transmission device makes it possible for the data transmission device to acquire the communication identifiers of the candidate addressees, and possible to set the communication identifier of the addressee to which the data intended to be sent is to be sent, via the data transfer server. That is, it becomes possible to send data to the addressee intended by the user, even in a case where the user is unable to establish the communication identifier of the addressee. There will also not be useless receipt of data intended to be sent that is not to be transferred from the data transfer server, because the data transfer server receives the data intended to be sent in association with the job identifier after having sent the job identifier associated with the addressee to the data transmission devices.

The functions of each of the units set forth in the claims are executed by the hardware resources for which the configuration itself establishes a function, by hardware resources for which a program establishes a function, or by a combination thereof. The functions of each of the units are not limited to being executed by hardware resources that are physically independent of each other. The invention is realized also through a data transmission method, a data transmission program, a data transfer program, or a recording medium therefor. It shall be readily understood that the recording medium of the computer program can be a magnetic recording medium, a magneto-optical recording medium, or any recording medium that will be developed in the future.

BRIEF DESCRIPTION OF THE DRAWINGS

Referring now to the attached drawings which form a part of this original disclosure.

DETAILED DESCRIPTION OF EXEMPLARY EMBODIMENTS

Figures 1, 2:
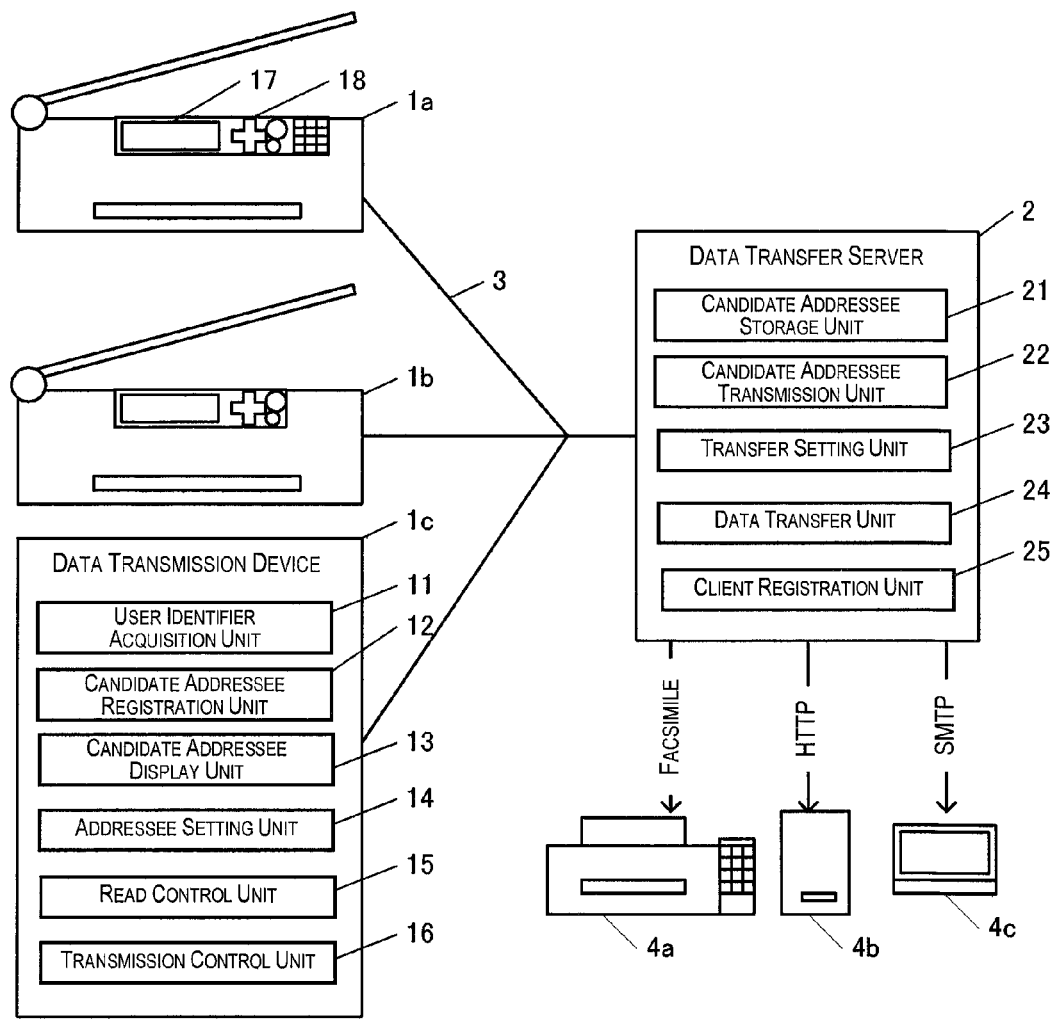
FIG. 1 is a block diagram according to an embodiment of the invention.
FIG. 2 is a data structure diagram according to an embodiment of the invention.

Modes for carrying out the invention shall be described below in the following order, with reference to the accompanying drawings. Constituent elements that correspond to each other in each of the drawings have been assigned like reference numerals, and duplicate descriptions thereof have been omitted.

1. Overall Summary

FIG. 1 is a block diagram illustrating the overall configuration of a data communication network including a plurality of multifunction printers 1, serving as data transmission devices, and a data transfer server 2. Each of the multifunction printers 1a, 1b, 1c and the data transfer server 2 are connected to each other over the Internet 3. From each of the multifunction printers 1a, 1b, 1c, it is possible to send data intended to be sent which has been read from a document, addressed to any desired data receiving device, such as a facsimile 4a, a personal computer (PC) 4c, or a data storage server 4b, connected to the data transfer server 2 over a communication network.

2. Configuration of the Data Transfer Server

The data transfer server 2 is constituted of one or more computer system(s) provided with (not shown) a processor, a main memory, a ROM, a communication interface unit, a hard disk device, and the like. A data transfer program executed by the processor causes the hardware resources of the data transfer server 2 to function as a candidate addressee storage unit 21, a candidate addressee transmission unit 22, a transfer setting unit 23, a data transfer unit 24, a client registration unit 25, and the like (described below).

The candidate addressee storage unit 21 is a database for storing communication identifiers for a plurality of data receiving devices, in association with any user identifier. That is, the candidate addressee storage unit 21 stores communication identifiers of a plurality of communication protocols, such as a contact line number for the facsimile 4a, an email address for the PC 4c, and a URL for the data storage server 4b, in a transfer destination database and in association with a user identifier.

FIG. 2 illustrates one example of a transfer destination database. The user identifier is an identifier that has been set in place for a user who uses the data communication system of the present embodiment, and is a text string that is unique to every user (example: ito 1234). An address name is constituted of a text string (for example: SUZUKI GORO) that is defined by the user in order to identify a data receiving device. The communication identifier specifies the data receiving device that will serve as the addressee, and is constituted of a text string that conforms to the communication protocol used by the data transfer server 2 in the process of transferring data to the data receiving device. For example, when the addressee data receiving device is the facsimile 4a, the PC 4c, or the data storage server 4b, then a contact line number "012-234-5678", an email address "s-ito@sankou.co.jp", or a URL "www.nagoya.com/eigyo/", respectively, is registered in the transfer destination database as the communication identifier.

The candidate addressee transmission unit 22 receives the user identifier from the plurality of registered multifunction printers 1a, 1b, 1c, and returns the communication identifier of the candidate addressee corresponding to the received user identifier. The communication protocol used to send and receive the user identifiers and the communication identifiers is the Hypertext Transfer Protocol (HTTP).

The transfer setting unit 23 receives from the plurality of registered multifunction printers 1a, 1b, 1c the communication identifier of the data receiving device that is to serve as the transfer destination, and both stores a job identifier and the received communication identifier in mutual association, and also returns the job identifier to the corresponding multifunction printer 1a, 1b, 1c. The transfer setting unit 23 also analyzes the received communication identifier and specifies a communication protocol that conforms to the received communication identifier. The communication protocol used to send and receive the communication identifiers and the job identifiers is HTTP.

The data transfer unit 24 receives data intended to be sent, together with the job identifier, from the plurality of multifunction printers 1, and transfers the data intended to be sent, addressed to the communication identifier corresponding to the received job identifier. The communication protocol used to send and receive the job identifiers and the data intended to be sent is HTTP. Meanwhile, the data transfer unit 24 uses a communication protocol that conforms to the communication identifier of the transfer destination, to transfer the data intended to be sent. For example, when the transfer destination is the facsimile 4a, a facsimile standard such as G3 is used, and when the transfer destination is the data storage server 4b, HTTP is used.

The client registration unit 25 registers the plurality of multifunction printers 1 as clients of the data communication system, by registering the respective communication identifiers thereof in a database. The registration of such description is carried out in response to a request from a multifunction printer 1 when the multifunction printer 1 is being set up.

3. Configuration of the Multifunction Printers

Each of the multifunction printers 1a, 1b, 1c registered as a client of the data transfer server 2 is provided with: a display 17; an operation key 18; a computer system constituted of (not shown) a processor, a main memory, a ROM, a communication interface unit, and the like; an image reading mechanism constituted of a line image sensor, a carriage, an actuator, and the like; and a print mechanism constituted of an ink ejection head, a carriage, an actuator, and the like. The execution of a data transmission program by the processor causes the hardware resources of the multifunction printers 1a, 1b, 1c to function as a user identifier acquisition unit 11, a candidate addressee registration unit 12, a candidate addressee display unit 13, an addressee setting unit 14, a read control unit 15, and a transmission control unit 16 (described below).

The user identifier acquisition unit 11 accepts the inputting of the user identifier, for which the operation key 18 is used.

The candidate addressee registration unit 12 registers candidate addressee information in the data transfer server 2 by sending the address names and the communication identifiers of the data receiving devices, in association with the user identifier, to the data transfer server 2.

The candidate addressee display unit 13 receives the address names and the communication identifiers of candidate addressees from the data transfer server 2, through the transmission of the user identifier to the data transfer server 2, and displays the addressees on the display 17 so that the addressees can be selected using the operation key 18.

The addressee setting unit 14 receives the job identifier corresponding to the selected addressee from the data transfer server 2, through the transmission, to the data transfer server 2, of the communication identifier corresponding to the addressee selected from the candidate addressees by the operation key 18.

The read control unit 15, serving as a data acquisition unit, reads data intended to be sent, from a document intended to be sent, by controlling a read mechanism in response to the receipt of a job identifier.

The transmission control unit 16 causes the data intended to be sent to be transferred from the data transfer server 2 to the data receiving device corresponding to the job identifier, by sending the data intended to be sent to the data transfer server 2 in association with the job identifier.

4. Data Communication Method

Figure 3:
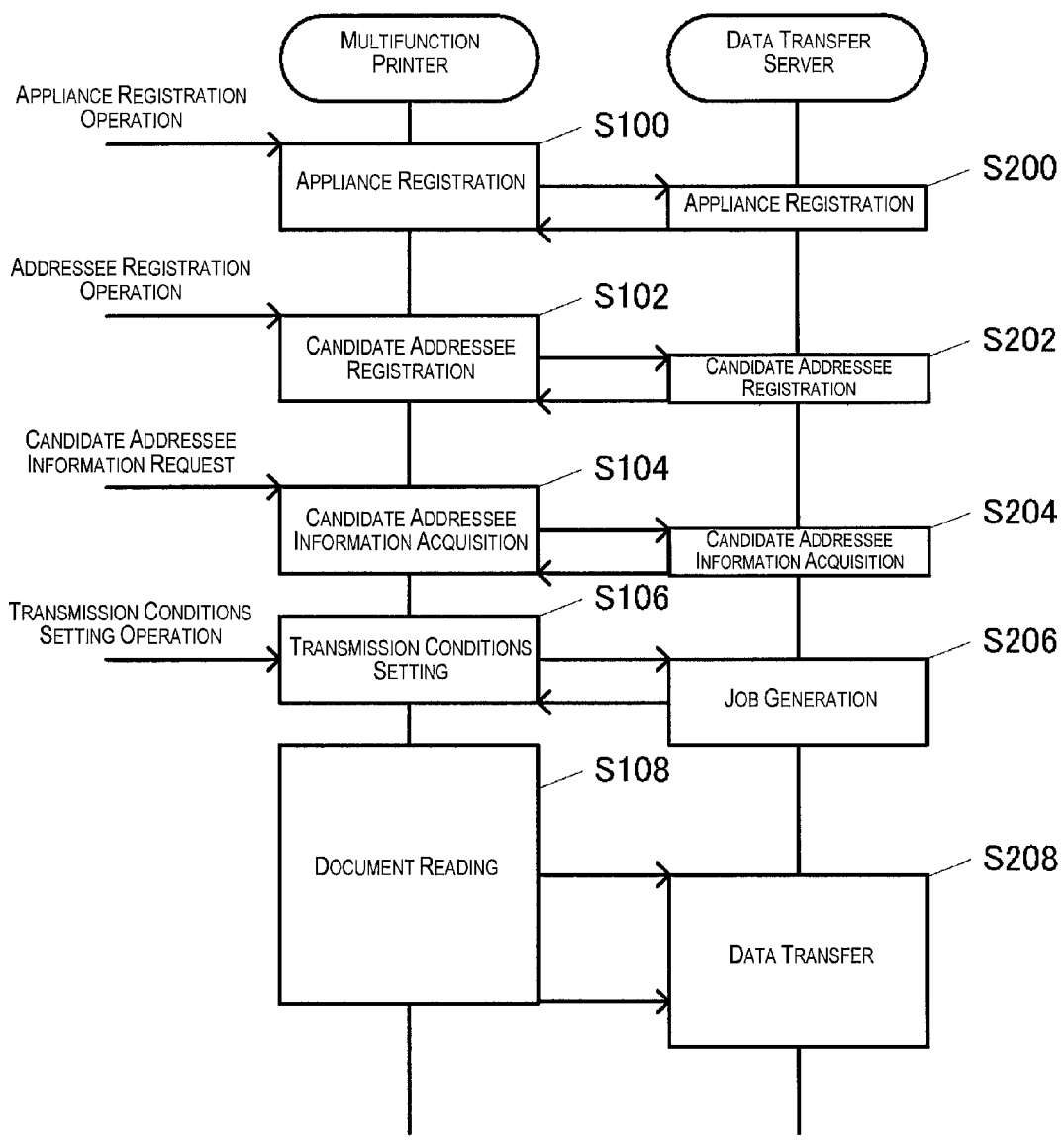
FIG. 3 is a sequence chart according to an embodiment of the invention.

FIG. 3 illustrates the flow of data communication using the above-described multifunction printers 1a, 1b, 1c. FIGS. 4A-4F illustrate one example of the manner in which the display 17 of the multifunction printer 1 transitions between screens.

First, device registration processing for registering the multifunction printers 1a, 1b, 1c as clients of the data transfer server 2 is executed (S100). The device registration processing is activated by an device registration operation that is performed by the user. In the device registration processing, the multifunction printers 1a, 1b, 1c request to be registered as clients by the data transfer server 2 by sending device identifiers or the like, which are information for the purpose of identification stored in advance by the multifunction printers themselves. The data transfer server 2, having received the requests to register the devices, registers the received device identifiers in a client database, and returns a reply stating that the multifunction printers 1 have been registered, to the multifunction printers 1a, 1b, 1c (S200). The communication between the multifunction printers 1 and the data transfer server 2 associated with the device registration processing of such description is carried out using HTTP.

In order to make it possible for the candidate addressee information to be acquired from the data transfer server 2 in the multifunction printers 1a, 1b, 1c that have been registered in the data transfer server 2, processing for registering the candidate addressee information in the data transfer server 2 in advance is needed. The user can also register the candidate addressee information in the data transfer server 2 by operating a PC or the like, but FIG. 3 illustrates an example where candidate addressee information is registered in the data transfer server 2 through operation of the multifunction printers 1a, 1b, 1c. The candidate addressee information includes the communication identifiers and the address names stored in the previously described transfer destination database. The candidate addressee information, as has already been described, is stored in the transfer destination database in association with one user identifier.

More specifically, the user uses the operation key 18 to input into the multifunction printers 1a user identifier, which is information for the purpose of identification of which the user has been notified in advance, and thereafter executes an addressee registration operation for inputting into the multifunction printers 1 the communication identifier of the data receiving device and the address name. As a result, the multifunction printers 1 transmit to the data transfer server 2 the communication identifiers of the data receiving devices and the address name in association with the inputted user identifier (S102).

The data transfer server 2, having received the user identifier, the address names, and the communication identifiers from the multifunction printers 1, registers the address names and the communication identifiers in the transfer destination database, in association with the user identifier, and notifies the multifunction printers 1 of the completion of registration (S202).

When the candidate addressee registration processing is carried out in this manner, merely the inputting of the user identifier and the selection of the address name makes it possible to set as the addressee the communication identifier of the data receiving device, which was registered in advance, in any desired multifunction printer registered in the data transfer server as a client. For this reason, the user will be able to send data intended to be sent to an addressee at any desired multifunction printer, as shall be described below, even in a state where the user does not remember the communication identifier of the addressee. FIG. 3 illustrates an example where the candidate addressee information is acquired at the multifunction printer for which addressee registration processing was executed; however, with a multifunction printer for which device registration has been carried out, even though addressee registration processing can not have been executed at the multifunction printer, a user who holds the user identifier is capable of an execution, which is the processing of step S104 onward, in which the addressee is selected from the candidate addressees and the communication identifier of the addressee is set.

Figure 4A:
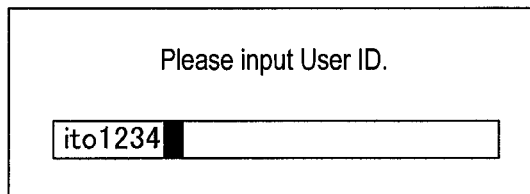
FIGS. 4A to 4F are screen transition diagrams according to an embodiment of the invention.
Figure 4B:
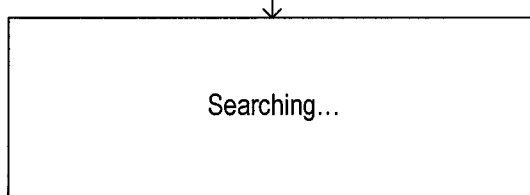

More specifically, the user uses the operation key 18 to select a scan transmission mode. When the user inputs a user identifier to request the candidate addressee information on an input screen that is displayed on the display 17 by the multifunction printer 1 in response thereto, the multifunction printer 1 sends the inputted user identifier to the data transfer server 2 (S104). FIG. 4A illustrates one example of an input screen for the user identifier that is displayed on the display 17 of the multifunction printers 1a, 1b, 1c. FIG. 4B illustrates one example of a standby screen that is displayed after the user identifier has been sent to the data transfer server 2 from the multifunction printers 1a, 1b, 1c.

Figure 4C:
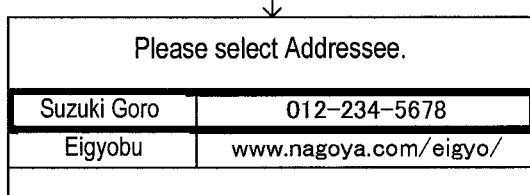

From the transfer destination database, the data transfer server 2 acquires the communication identifiers and the address names stored in association with the received user identifier, and returns same to the multifunction printer 1 (S204). As a result, the multifunction printer 1 receives the communication identifiers and the address names corresponding to the user identifier inputted by the user, and the display 17 displays the address names so that the address names can be selected using the operation key 18. FIG. 4C illustrates one example of a display screen for candidate addressee information that is displayed on the displays 17 of the multifunction printers 1a, 1b, 1c. The displays 17 produce displays listing the plurality of candidate addressees in one layer, and produce a highlighted display of the candidate addressee over which a cursor is positioned. In this manner, preferably, the candidate addresses are displayed in a list in the same row, irrespective of the type of communication protocol, whether the communication identifiers of the candidate addressees be a contact line number for facsimile, an address for e-mail, or a URL.

Figure 4D:
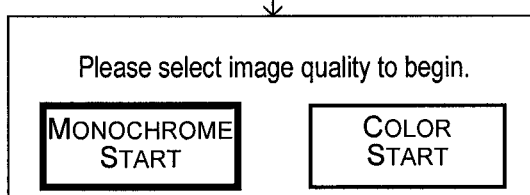

The user, having inputted the user identifier, moves the cursor up or down by operating an up-down key, and selects the addressee over which the cursor is positioned by operation a decision key. When the addressee is selected, as a selection result, the multifunction printer 1 sends to the data transfer server 2 information whereby the data transfer server 2 will be able to recognize the selected addressee, such as the communication identifier corresponding to the selected addressee or the number belonging to the addressee. The user places the document intended to be sent upon a platen glass, or the like, and uses the operation key 18 to set the transmission conditions, such as setting the image quality (S106). In the state where the screen illustrated in FIG. 4C is being displayed, the user selects any one of the candidate addressees using the operation key 18, and confirms the selection. In so doing, the display transitions to an image quality selection screen illustrated in FIG. 4D. In the state where the screen illustrated in FIG. 4D is being displayed, the user uses the operation key 18 to select whether the document is to be read in monochrome or in color, and confirms the transmission conditions. Once the transmission conditions have been confirmed, the multifunction printers 1a, 1b, 1c transmit to the data transfer server 2 the communication identifier corresponding to the selected addressee as well as the read conditions.

Having received the communication identifier, the data transfer server 2 generates a job for sending the data intended to be sent, for the data receiving device corresponding to the received communication identifier, and returns an identifier for the generated job (a job identifier) to the multifunction printer 1 (S206).

At this time, the data transfer server 2 analyzes the received communication identifier, decides the communication protocol corresponding to the communication identifier, and sets the decided communication protocol to the job. More specifically, in a case where a communication identifier of a predetermined number of characters is constituted of only numeric characters or of only numeric characters and hyphens, the communication identifier is understood to be a contact line number for facsimile, and a job using a facsimile standard is generated to transfer the data intended to be sent. In a case where the communication identifier is constituted only of alphanumeric characters that include an "@" symbol, then the communication identifier is understood to be an address for e-mail, and a job using the Simple Mail Transfer Protocol (SMTP) is generated to transfer the data intended to be sent. In a case where the communication identifier is constituted only of alphanumeric characters that include "http://", then the communication identifier is understood to be a URL, and a job using HTTP is generated to transfer the data intended to be sent. The data transfer server 2 sends to the multifunction printer 1 an address in order for the data transfer server 2 to receive the data intended to be sent (a receipt address), together with the job identifier. The job is therefore information that establishes the communication identifier of the transfer destination, the communication protocol, and the receipt address of the data intended to be sent, and that is recognized by the job identifier.

Figure 4E:
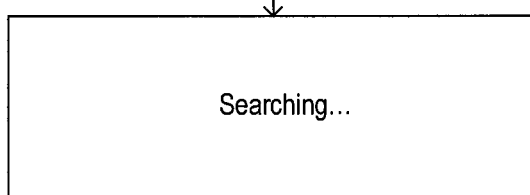
Figure 4F:
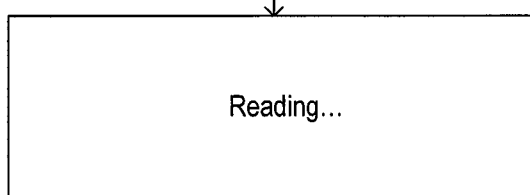

Having received the job identifier, the multifunction printer 1 reads the data intended to be sent from the document, and transmit the read data intended to be sent to the receipt address received from the data transfer server 2, together with the job identifier (S108). That is, the multifunction printer 1 receives the job identifier and for the first time enters a state of being able to begin reading the data intended to be sent. FIG. 4E is one example of a standby screen that is displayed on the displays 17 of the multifunction printers 1a, 1b, 1c during a period spanning from after the communication identifier has been sent to the data transfer server 2 until when the job identifier is received. Upon receipt of the job identifier by the multifunction printers 1a, 1b, 1c, the reading of the document is initiated, and a status screen illustrated in FIG. 4F is displayed on the displays 17 during the reading of the document.

Having received the data intended to be sent, the data transfer server 2 transfers the data intended to be sent to the data receiving device having the communication identifier corresponding to the job identifier that was received together with the data intended to be sent (S208). More specifically, the data transfer server 2 uses the job identifier to acquire the job, and establishes the communication protocol and the communication identifier set for the job. The data transfer server 2 then converts the format of the data intended to be sent, when needed, in accordance with the established communication protocol. Thereafter, the data transfer server 2 uses the communication protocol set for the job to send the data intended to be sent, addressed to the communication identifier set for the job. Therefore, when, for example, the data receiving device of the addressee is the facsimile 4a, the facsimile standard is used to transfer the data intended to be sent having been converted into a facsimile image; when the data receiving device of the addressee is the PC 4c, SMTP is used to transfer the data intended to be sent; and when the data receiving device of the addressee is the data storage server 4b, HTTP is used to transfer the data intended to be sent. Thereafter, the outcome of the transfer is stored in a log of the data transfer server 2 and notification thereof is provided to the multifunction printer 1 from the data transfer server 2; the outcome is also displayed on the displays 17 of the multifunction printers 1, and the processing is concluded.

According to the embodiment described above, the inputting of a user identifier by an unspecified number of users who utilize the multifunction printers 1a, 1b, 1c makes it possible for the data transmission devices to acquire the communication identifiers of the candidate addressees, and possible to set the communication identifier of the addressee to which the data intended to be sent is to be sent, via the data transfer server. Also, because the data transmission devices acquire the data intended to be sent after having acquired the job identifier associated with the addressee, there will not be useless acquisition, by the data transmission devices, of data intended to be sent that is not to be transferred from the data transfer server. It is further possible to send the data intended to be sent to any desired data receiving device among the data receiving devices, which have different communication protocols for receiving the data intended to be sent, including facsimile, HTTP, and SMTP. Because the data transmission devices are made to display the candidate addressees without regard for the communication protocol of the addressee, it is easier to operate the setting of the addressee in comparison to a case where the candidate addressees are displayed with the user interface (UI) being subdivided into each different communication protocol of the addressees. That is, according to the above-described embodiment, the user is able to send the image data of a document to a facsimile, PC, data storage server, or the like from any desired data transmission device, as though the user were summoning a registration telephone direction at a facsimile belonging to the user and setting the addressee to send the data.

5. Other Embodiments

A mode for carrying out the invention has been described above on the basis of the embodiment, but the technical scope of the invention is not limited to the embodiment described above, and it will be readily understood that a variety of modifications can be added in a scope that does not depart from the spirit of the invention, such as by combining the following modification examples. For example, although the example of multifunction printers as the data transmission device has been illustrated, the data transmission device can also be a scanner, a digital camera, or a portable information terminal, provided that the data transmission device is equipped with a data communication function. Also, although the example of image data that is read from a document as the data intended to be sent has been illustrated, the data intended to be sent can also be text data, vector data, or image data that has been read in from a removable memory or hard disk device.

Also, information for identifying the communication protocol can be recorded in the transfer destination database, whereby there is no longer a need for the communication identifier to be analyzed. A log-in ID or log-in password for logging into the data receiving device can also be recorded, whereby data is sent after the data transfer server 2 has logged in to a data receiving device for which data receipt necessitates logging in. A scan image quality can also be recorded, where the use thereof for scanning allows for the omission of the image quality setting by the user.

Although an example where the multifunction printers 1 are notified of the address name and the communication identifier from the data transfer server 2 and a display of the address name and the communication identifier is produced has been illustrated, as a mode for displaying the candidate addressees, notification of only the address name can also be provided for display, or notification of only the communication identifier can be provided for display. Further, although the example of a contact line number, an e-mail address, and a URL as the communication identifier has been illustrated, the identifier can be of any kind, and can further include a password, provided that the identifier be identification information needed for the data transfer server to be able to send the data intended to be sent. The display also need not be one single layer; rather, the user can specify a membership group at a layer for registering the communication identifier or the like, whereby a display is produced on a plurality of layers for every membership group.

Additionally, although the example of HTTP has been illustrated as the communication protocol between the data transmission devices and the data transfer server, another data communication protocol, such as XMPP, SMTP, TelNet, or the like can also be used.

It shall also be readily understood that the above-described relationship between operation and the screen transitions is merely an example. For example, the operation to set the image quality can be carried out in advance of the selection of the addressee. Also, the server can include one computer device, or can include a plurality of computer devices.

What is claimed is:

1. A data transmission device, comprising:
a candidate addressee display unit configured to receive an information relating to a candidate addressee via a network from an outside of the data transmission device, and display an addressee selection screen so that the candidate addressee is selected, the outside being a data transfer server that connects the data transmission device via the network;
an addressee setting unit configured to notify the outside of the data transmission device of a selection result of the candidate addressee via the network, and thereby set the addressee, the addressee setting unit receiving a job identifier from the outside of the data transmission device via the network in response to notifying the selection result, the job identifier identifying a communication identifier and a receipt address, the communication identifier specifying the addressee, the receipt address indicating an address of the outside that the outside uses to receive data intended to be sent;
a data acquisition unit configured to acquire the data intended to be sent; and
a transmission control unit configured to send the data intended to be sent to the data transfer server, which is the outside of the data transmission device, via the network, to cause a format of the data intended to be send to be converted in accordance with the addressee by the data transfer server, and to cause the data intended to be sent to be transferred to the addressee by the data transfer server.

2. The data transmission device as set forth in claim 1, wherein
the data acquisition unit acquires the data intended to be sent, after the notification.

3. The data transmission device as set forth in claim 1, wherein
the addressee setting unit carries out the notification in accordance with a selection made by the user.

4. The data transmission device as set forth in claim 1, wherein
the data acquisition unit initiates processing for acquiring the data intended to be sent after the notification.

5. The data transmission device as set forth in claim 1, wherein
the data acquisition unit creates the data intended to be set by scanning from a document intended to be sent.

6. The data transmission device as set forth in claim 1, wherein
the candidate addressee display unit displays the addressee selection screen so that a plurality of the candidate addressees corresponding to a plurality of the communication protocols which are mutually different can be selected.

7. The data transmission device as set forth in claim 1, wherein
the candidate addressee display unit displays a plurality of the candidate addressees in a list.

8. A data transfer server, comprising:
a candidate addressee storage unit configured to store a plurality of candidate addressees;
a candidate addressee transmission unit configured to send to an outside of the data transfer server via a network information relating to the candidate addressees, the outside being a data transmission device that connects the data transfer server via the network;
a transfer setting unit configured to receive from the outside of the data transfer server via the network a selection result of an addressee, set as a transfer destination the addressee indicated by the selection result, and transfer a job identifier to the outside of the data transfer server via the network, the job identifier identifying a communication identifier and a receipt address, the communication identifier specifying the addressee, the receipt address indicating an address of the data transfer server to receive data intended to be sent; and
a data transfer unit configured to receive the data intended to be sent from the data transmission device, which is the outside of the data transfer server, via the network, convert a format of the data intended to be sent in accordance with the addressee, and send the data intended to be sent to the addressee corresponding to the transfer destination.

9. A data transmission method, comprising:
receiving information relating to candidate addressees, by a data transmission device, from an outside of the data transmission device via a network, and displaying an addressee selection screen so that the candidate addressees is selected, the outside being a data transfer server that connects the data transmission device via the network;
notifying the outside of the data transmission device via the network of a selection result selected from the candidate addressees and thereby setting the addressee;
receiving a job identifier from the outside of the data transmission device via the network in response to notifying the selection result, the job identifier identifying a communication identifier and a receipt address, the communication identifier specifying the addressee, and the receipt address indicating an address of the outside that the outside uses to receive data intended to be sent;
acquiring the data intended to be sent; and
sending the data intended to be sent to the data transfer server, which is the outside of the data transmission device, via the network, to cause a format of the data intended to be send to be converted in accordance with the addressee by the data transfer server, and to cause the data intended to be sent to the selected addressee by the data transfer server.

10. The data transmission device as set forth in claim 1, wherein
the candidate addressee display unit accepts inputting of a user identifier identifying a user that uses the data transmission device, sends the user identifier to the outside of the data transmission device via the network, and receives the information relating to the candidate addressee that corresponds to the user identifier from the outside of the data transmission device via the network.

11. The data transmission device as set forth in claim 1, wherein
the data acquisition unit acquires the data intended to be sent after the addressee setting unit receives the job identifier from the outside of the data transmission device via the network.

* * * * *